US008838810B2

(12) United States Patent
Lucas et al.

(10) Patent No.: US 8,838,810 B2
(45) Date of Patent: *Sep. 16, 2014

(54) SYSTEMS AND METHODS FOR ESTABLISHING CONNECTIONS BETWEEN DEVICES COMMUNICATING OVER A NETWORK

(75) Inventors: Brian Lucas, San Francisco, CA (US); Ilya Asnis, San Jose, CA (US)

(73) Assignee: Sling Media, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,852

(22) Filed: Apr. 27, 2012

(65) Prior Publication Data

US 2012/0215929 A1    Aug. 23, 2012

Related U.S. Application Data

(63) Continuation of application No. 12/426,103, filed on Apr. 17, 2009, now Pat. No. 8,171,148.

(51) Int. Cl.
*G06F 15/16* (2006.01)
*H04L 29/06* (2006.01)
*H04L 29/08* (2006.01)

(52) U.S. Cl.
CPC ............ *H04L 65/1043* (2013.01); *H04L 63/02* (2013.01); *H04L 67/2838* (2013.01); *H04L 69/18* (2013.01); *H04L 65/605* (2013.01)
USPC ............................. 709/227; 709/231; 709/228

(58) Field of Classification Search
USPC ................................. 709/228, 203, 231, 227
See application file for complete search history.

(56) References Cited

U.S. PATENT DOCUMENTS

| 5,237,648 A | 8/1993 | Mills et al. |
|---|---|---|
| 5,706,290 A | 1/1998 | Shaw et al. |

(Continued)

FOREIGN PATENT DOCUMENTS

| CN | 1464685 | 12/2003 |
|---|---|---|
| EP | 1077407 A1 | 2/2001 |

(Continued)

OTHER PUBLICATIONS

International Search Report and Written Opinion, PCT/US2005/020105, Feb. 15, 2007, 6 pages.

(Continued)

*Primary Examiner* — El Hadji Sall
(74) *Attorney, Agent, or Firm* — Ingrassia Fisher & Lorenz, P.C.

(57) ABSTRACT

Systems and methods are described for establishing a connection between a client and a server that are each communicating via a network. The methods and techniques may be used, for example, to establish a media streaming connection between a media player and a placeshifting device when a firewall or other impediment to direct network connections exists. A relay server receives connection requests from the client and from the server via the network. In response to receiving the requests, a first connection is established between the relay server and the client and a second connection between the relay server and the server. Data received by the relay server on each of the first and second connections is relayed to the other of the first and second connections to thereby establish the connection between the client and the server via the relay server.

20 Claims, 3 Drawing Sheets

(56) References Cited

U.S. PATENT DOCUMENTS

Figure 1:
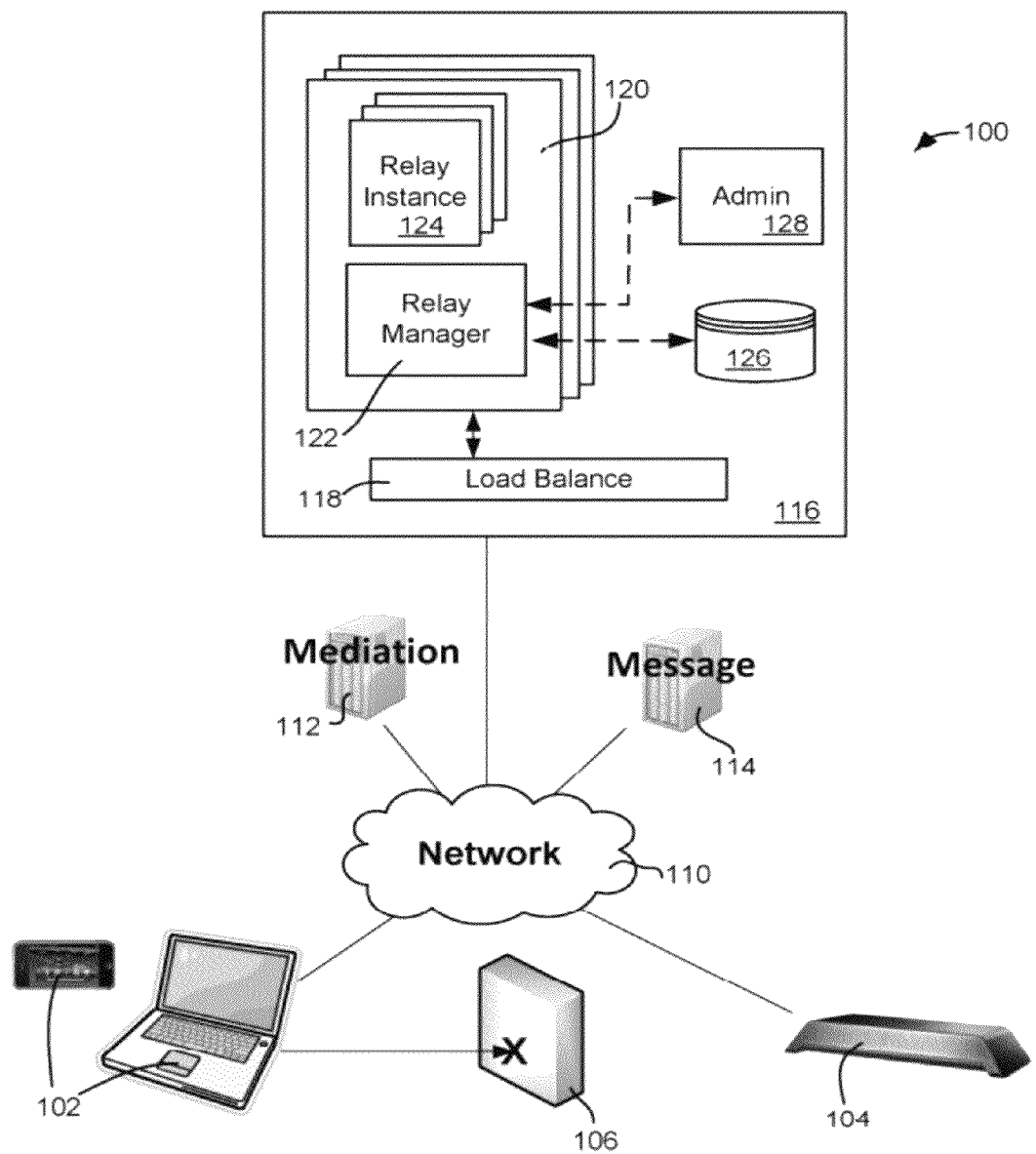

| | | | |
|---|---|---|---|
| 5,722,041 A | 2/1998 | Freadman | |
| 5,898,679 A | 4/1999 | Brederveld et al. | |
| 5,922,072 A | 7/1999 | Hutchinson et al. | |
| 5,936,968 A | 8/1999 | Lyons | |
| 5,968,132 A | 10/1999 | Tokunaga | |
| 6,049,671 A | 4/2000 | Slivka et al. | |
| 6,108,041 A | 8/2000 | Faroudja et al. | |
| 6,117,126 A | 9/2000 | Appelbaum et al. | |
| 6,223,211 B1 | 4/2001 | Hamilton et al. | |
| 6,240,531 B1 | 5/2001 | Spilo et al. | |
| 6,353,885 B1 | 3/2002 | Herzi et al. | |
| 6,370,688 B1 | 4/2002 | Hejna, Jr. | |
| 6,421,429 B1 | 7/2002 | Merritt et al. | |
| 6,442,067 B1 | 8/2002 | Chawla et al. | |
| 6,476,826 B1 | 11/2002 | Plotkin et al. | |
| 6,496,122 B2 | 12/2002 | Sampsell | |
| 6,553,147 B2 | 4/2003 | Chai et al. | |
| 6,598,159 B1 | 7/2003 | McAllister et al. | |
| 6,609,253 B1 | 8/2003 | Swix et al. | |
| 6,665,813 B1 | 12/2003 | Forsman et al. | |
| 6,704,847 B1 | 3/2004 | Six et al. | |
| 6,732,158 B1 | 5/2004 | Hesselink et al. | |
| 6,757,851 B1 | 6/2004 | Park et al. | |
| 6,795,638 B1 | 9/2004 | Skelley, Jr. | |
| 6,839,079 B2 | 1/2005 | Barlow et al. | |
| 7,020,892 B2 | 3/2006 | Levesque et al. | |
| 7,127,507 B1 | 10/2006 | Clark et al. | |
| 7,155,734 B1 | 12/2006 | Shimomura et al. | |
| 7,155,735 B1 | 12/2006 | Ngo et al. | |
| 7,478,164 B1 | 1/2009 | Lango et al. | |
| 7,478,166 B2 | 1/2009 | Agnoli et al. | |
| 7,502,733 B2 | 3/2009 | Andrsen et al. | |
| 7,516,136 B2 | 4/2009 | Lee et al. | |
| 7,558,862 B1 * | 7/2009 | Tyukasz et al. | 709/227 |
| 7,565,681 B2 | 7/2009 | Ngo et al. | |
| 7,594,218 B1 | 9/2009 | Lozben | |
| 7,647,614 B2 | 1/2010 | Krikorian et al. | |
| 7,676,590 B2 | 3/2010 | Silverman et al. | |
| 7,702,952 B2 | 4/2010 | Tarra | |
| 7,706,358 B2 | 4/2010 | Kitada | |
| 7,707,614 B2 | 4/2010 | Krikorian et al. | |
| 7,721,300 B2 | 5/2010 | Tipton et al. | |
| 7,721,315 B2 | 5/2010 | Brown et al. | |
| 7,725,912 B2 | 5/2010 | Margulis | |
| 7,769,756 B2 | 8/2010 | Krikorian et al. | |
| 7,877,776 B2 | 1/2011 | Krikorian et al. | |
| 7,895,275 B1 | 2/2011 | Evans et al. | |
| 7,917,602 B2 | 3/2011 | Sweatt, III et al. | |
| 7,921,150 B1 | 4/2011 | Schwartz | |
| 7,945,688 B1 | 5/2011 | Lango et al. | |
| 7,975,047 B2 | 7/2011 | Dongre | |
| 7,975,062 B2 | 7/2011 | Krikorian et al. | |
| 7,992,176 B2 | 8/2011 | Margulis | |
| 8,041,988 B2 | 10/2011 | Tarra et al. | |
| 8,051,454 B2 | 11/2011 | Krikorian et al. | |
| 8,060,609 B2 | 11/2011 | Banger et al. | |
| 8,082,545 B2 | 12/2011 | Prakash | |
| 8,099,755 B2 | 1/2012 | Bajpai et al. | |
| 8,149,851 B2 | 4/2012 | Asnis et al. | |
| 8,169,914 B2 | 5/2012 | Bajpal et al. | |
| 8,171,148 B2 | 5/2012 | Lucas et al. | |
| 8,194,681 B2 | 6/2012 | Kaarela et al. | |
| 8,266,657 B2 | 9/2012 | Margulis | |
| 2001/0021998 A1 | 9/2001 | Margulis | |
| 2002/0004839 A1 | 1/2002 | Wine et al. | |
| 2002/0012530 A1 | 1/2002 | Bruls | |
| 2002/0042921 A1 | 4/2002 | Ellis | |
| 2002/0112247 A1 | 8/2002 | Horner et al. | |
| 2002/0122137 A1 | 9/2002 | Chen et al. | |
| 2002/0143972 A1 | 10/2002 | Christopoulos et al. | |
| 2002/0167458 A1 | 11/2002 | Baudisch et al. | |
| 2002/0188818 A1 | 12/2002 | Nimura et al. | |
| 2002/0191575 A1 | 12/2002 | Kalavade et al. | |
| 2003/0001880 A1 | 1/2003 | Holtz et al. | |
| 2003/0065915 A1 | 4/2003 | Yu et al. | |
| 2003/0074660 A1 | 4/2003 | McCormack et al. | |
| 2003/0093260 A1 | 5/2003 | Dagtas et al. | |
| 2003/0115167 A1 | 6/2003 | Sharif et al. | |
| 2003/0187657 A1 | 10/2003 | Ethart et al. | |
| 2003/0198243 A1 * | 10/2003 | Yamada | 370/428 |
| 2003/0208612 A1 | 11/2003 | Harris et al. | |
| 2004/0052216 A1 | 3/2004 | Roh | |
| 2004/0083301 A1 | 4/2004 | Murase et al. | |
| 2004/0100486 A1 | 5/2004 | Flamini et al. | |
| 2004/0103340 A1 | 5/2004 | Sundareson et al. | |
| 2004/0162903 A1 | 8/2004 | Oh | |
| 2004/0177151 A1 | 9/2004 | Kryeziu | |
| 2004/0194141 A1 | 9/2004 | Sanders | |
| 2004/0221029 A1 * | 11/2004 | Jenkins et al. | 709/223 |
| 2004/0255249 A1 | 12/2004 | Chang et al. | |
| 2005/0038981 A1 | 2/2005 | Connor et al. | |
| 2005/0050462 A1 | 3/2005 | Whittle et al. | |
| 2005/0060759 A1 | 3/2005 | Rowe et al. | |
| 2005/0132351 A1 | 6/2005 | Randall et al. | |
| 2005/0155077 A1 | 7/2005 | Lawrence et al. | |
| 2006/0050970 A1 | 3/2006 | Gunatilake | |
| 2006/0064307 A1 | 3/2006 | Pakkala | |
| 2006/0095401 A1 | 5/2006 | Krikorian et al. | |
| 2006/0107226 A1 | 5/2006 | Matthews et al. | |
| 2006/0171395 A1 | 8/2006 | Deshpande | |
| 2006/0190616 A1 | 8/2006 | Mayerhofer et al. | |
| 2006/0206526 A1 | 9/2006 | Sitomer | |
| 2006/0230345 A1 | 10/2006 | Weng et al. | |
| 2006/0280177 A1 | 12/2006 | Gupta et al. | |
| 2006/0294183 A1 | 12/2006 | Agnoli et al. | |
| 2007/0003224 A1 * | 1/2007 | Krikorian et al. | 386/95 |
| 2007/0005783 A1 | 1/2007 | Saint-Hillaire et al. | |
| 2007/0019545 A1 | 1/2007 | Alt et al. | |
| 2007/0043792 A1 | 2/2007 | O'Brien | |
| 2007/0067390 A1 | 3/2007 | Agnoli et al. | |
| 2007/0073767 A1 | 3/2007 | Springer, Jr. et al. | |
| 2007/0076604 A1 | 4/2007 | Litwack | |
| 2007/0107019 A1 | 5/2007 | Romano et al. | |
| 2007/0136778 A1 | 6/2007 | Birger et al. | |
| 2007/0147263 A1 | 6/2007 | Liao et al. | |
| 2007/0183436 A1 | 8/2007 | Hunter | |
| 2007/0198532 A1 | 8/2007 | Krikorian et al. | |
| 2007/0217407 A1 | 9/2007 | Yuan et al. | |
| 2007/0286596 A1 | 12/2007 | Lonn | |
| 2007/0288550 A1 | 12/2007 | Ise et al. | |
| 2008/0007651 A1 | 1/2008 | Bennett | |
| 2008/0037573 A1 | 2/2008 | Cohen | |
| 2008/0059533 A1 * | 3/2008 | Krikorian | 707/104.1 |
| 2008/0195698 A1 | 8/2008 | Stefanovic et al. | |
| 2008/0195744 A1 | 8/2008 | Bowra et al. | |
| 2008/0199150 A1 | 8/2008 | Candelore | |
| 2008/0209487 A1 | 8/2008 | Osann et al. | |
| 2008/0215392 A1 | 9/2008 | Rajan | |
| 2008/0229404 A1 * | 9/2008 | Siegrist et al. | 726/13 |
| 2008/0256485 A1 | 10/2008 | Krikorian | |
| 2008/0294759 A1 | 11/2008 | Biswas et al. | |
| 2008/0301233 A1 * | 12/2008 | Choi | 709/205 |
| 2008/0307456 A1 | 12/2008 | Beetcher et al. | |
| 2008/0307462 A1 | 12/2008 | Beetcher et al. | |
| 2008/0307463 A1 | 12/2008 | Beetcher et al. | |
| 2009/0074380 A1 | 3/2009 | Boston et al. | |
| 2009/0080448 A1 | 3/2009 | Tarra et al. | |
| 2009/0102983 A1 | 4/2009 | Malone et al. | |
| 2009/0103607 A1 | 4/2009 | Bajpai et al. | |
| 2009/0133088 A1 | 5/2009 | Kim et al. | |
| 2009/0146779 A1 | 6/2009 | Kumar et al. | |
| 2009/0157697 A1 | 6/2009 | Conway et al. | |
| 2009/0157777 A1 | 6/2009 | Golwalkar et al. | |
| 2009/0199248 A1 | 8/2009 | Ngo et al. | |
| 2009/0254672 A1 | 10/2009 | Zhang | |
| 2009/0268740 A1 | 10/2009 | Sindhu et al. | |
| 2009/0282445 A1 | 11/2009 | Yang et al. | |
| 2010/0001960 A1 | 1/2010 | Williams | |
| 2010/0005483 A1 * | 1/2010 | Rao | 725/25 |
| 2010/0023642 A1 | 1/2010 | Ladd et al. | |
| 2010/0030880 A1 | 2/2010 | Joshi et al. | |
| 2010/0061708 A1 | 3/2010 | Barton | |
| 2010/0064055 A1 | 3/2010 | Krikorian et al. | |
| 2010/0064332 A1 | 3/2010 | Krikorian et al. | |

(56) References Cited

U.S. PATENT DOCUMENTS

| | | | |
|---|---|---|---|
| 2010/0070925 A1* | 3/2010 | Einaudi et al. ............... | 715/830 |
| 2010/0071076 A1 | 3/2010 | Gangotri et al. | |
| 2010/0100898 A1 | 4/2010 | Pfleging et al. | |
| 2010/0100915 A1 | 4/2010 | Krikorian et al. | |
| 2010/0129057 A1 | 5/2010 | Kulkarni | |
| 2010/0169477 A1 | 7/2010 | Stienhans et al. | |
| 2010/0192184 A1 | 7/2010 | Margulis | |
| 2010/0192185 A1 | 7/2010 | Margulis | |
| 2010/0192188 A1 | 7/2010 | Rao | |
| 2010/0226444 A1 | 9/2010 | Thevathasan et al. | |
| 2010/0232438 A1 | 9/2010 | Bajpal et al. | |
| 2010/0269144 A1 | 10/2010 | Forsman et al. | |
| 2010/0281042 A1 | 11/2010 | Windes et al. | |
| 2010/0309916 A1 | 12/2010 | Oskouy et al. | |
| 2010/0333162 A1 | 12/2010 | Lloyd et al. | |
| 2011/0002381 A1 | 1/2011 | Yang et al. | |
| 2011/0019839 A1 | 1/2011 | Nandury | |
| 2011/0032986 A1 | 2/2011 | Banger et al. | |
| 2011/0033168 A1 | 2/2011 | Iyera | |
| 2011/0035462 A1 | 2/2011 | Akella | |
| 2011/0035466 A1 | 2/2011 | Panigrahi | |
| 2011/0035467 A1 | 2/2011 | Thiyagarajan et al. | |
| 2011/0035668 A1 | 2/2011 | Thiyagarajan | |
| 2011/0035669 A1 | 2/2011 | Shirali et al. | |
| 2011/0035741 A1 | 2/2011 | Thiyagarajan | |
| 2011/0035765 A1 | 2/2011 | Shirali | |
| 2011/0047079 A1 | 2/2011 | Du et al. | |
| 2011/0050908 A1 | 3/2011 | Nam | |
| 2011/0051016 A1 | 3/2011 | Malode | |
| 2011/0055864 A1 | 3/2011 | Shah et al. | |
| 2011/0113354 A1 | 5/2011 | Thiyagarajan et al. | |
| 2011/0119325 A1 | 5/2011 | Paul et al. | |
| 2011/0125861 A1 | 5/2011 | Evans et al. | |
| 2011/0150432 A1 | 6/2011 | Paul et al. | |
| 2011/0153718 A1 | 6/2011 | Dham et al. | |
| 2011/0153845 A1 | 6/2011 | Rao et al. | |
| 2011/0158610 A1 | 6/2011 | Paul et al. | |
| 2011/0191456 A1 | 8/2011 | Jain | |
| 2011/0208506 A1 | 8/2011 | Gurzhi et al. | |
| 2011/0307608 A1 | 12/2011 | Chang et al. | |
| 2012/0039580 A1 | 2/2012 | Sweatt, III et al. | |
| 2012/0166669 A1 | 6/2012 | Price | |
| 2012/0219001 A1 | 8/2012 | Sindhu et al. | |

FOREIGN PATENT DOCUMENTS

| | | |
|---|---|---|
| GB | 2307151 A | 5/1997 |
| JP | 2001211416 | 8/2001 |
| JP | 2001345766 | 12/2001 |
| JP | 2003304231 | 10/2003 |
| JP | 2005229152 | 8/2005 |
| JP | 2006054535 | 2/2006 |
| JP | 2006295909 | 10/2006 |
| JP | 2007181123 | 7/2007 |
| JP | 2008172621 | 7/2008 |
| JP | 2009009582 | 1/2009 |
| JP | 2009077212 | 4/2009 |
| JP | 2009118032 | 5/2009 |
| WO | 0133839 A1 | 5/2001 |
| WO | 03026232 A1 | 3/2003 |
| WO | 03098897 A | 11/2003 |
| WO | 2006064454 A1 | 6/2006 |
| WO | 2006074110 A | 7/2006 |
| WO | 2007027891 A2 | 3/2007 |
| WO | 2007051156 A2 | 5/2007 |
| WO | 2007096001 A1 | 8/2007 |
| WO | 2007141555 A2 | 12/2007 |
| WO | 2007149466 A2 | 12/2007 |
| WO | 2008024723 A | 2/2008 |
| WO | 2009073828 A1 | 6/2009 |
| WO | 2009073830 A1 | 6/2009 |

OTHER PUBLICATIONS

International Search Report and Written Opinion for International Application No. PCT/US2006/025911, mailed Jan. 3, 2007.

Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.

Microsoft Corporation; Harman/Kardon "Master Your Universe" 1999.

Matsushita Electric Corporation of America MicroCast: Wireless PC Multimedia Transceiver System, Nov. 1998.

"Wireless Local Area Networks: Issues in Technology and Standards" Jan. 6, 1999.

China State Intellectual Property Office "First Office Action," issued Jul. 31, 2009, for Application No. 200580026825.X.

European Patent Office, International Searching Authority, "International Search Report," for International Application No. PCT/US2009/049006, mailed Sep. 11, 2009.

European Patent Office, European Search Report, mailed Sep. 28, 2009 for European Application No. EP 06 78 6175.

International Search Report for PCT/US2008/069914 mailed Dec. 19, 2008.

PCT Partial International Search, PCT/US2009/054893, mailed Dec. 23, 2009.

Newton's Telecom Dictionary, 21st ed., Mar. 2005.

Ditze M. et all "Resource Adaptation for Audio-Visual Devices in the UPnP QoS Architecture," Advanced Networking and Applications, 2006; AINA 2006; 20% H International conference on Vienna, Austria Apr. 18-20, 2006.

Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.

Lowekamp, B. et al. "A Hierarchy of Network Performance Characteristics for Grid Applications and Services," GGF Network Measurements Working Group, pp. 1-29, May 24, 2004.

Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.

Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.

Srisuresh, P. et al. "Traditional IP Network Address Translator (Traditional NAT)," Network Working Group, The Internet Society, Jan. 2001.

China State Intellectual Property Office "First Office Action," issued Jan. 8, 2010, for Application No. 200810126554.0.

Australian Government "Office Action," Australian Patent Application No. 2006240518, mailed Nov. 12, 2009.

Newton's Telcom Dictionary, 20th ed., Mar. 2004.

"The Authoritative Dictionary of IEEE Standard Terms," 7th ed. 2000.

European Patent Office, International Searching Authority, "International Search Report," mailed Mar. 30, 2010; International Application PCT/US2009/068468 filed Dec. 27, 2009.

Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.

China State Intellectual Property Office "Office Action" issued Mar. 18, 2010 for Application No. 200680022520.6.

China State Intellectual Property Office "Office Action" issued Apr. 13, 2010 for Application No. 200580026825.X.

Canadian Intellectual Property Office "Office Action" mailed Feb. 18, 2010 for Application No. 2569610.

European Patent Office "European Search Report," mailed May 7, 2010 for Application No. 06786174.0.

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297,

(56) References Cited

OTHER PUBLICATIONS

XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
Korean Intellectual Property Office "Official Notice of Preliminary Rejection," issued Jun. 18, 2010; Korean Patent Application No. 10-2008-7021254.
European Patent Office, International Searching Authority, "International Search Report," mailed Dec. 13, 2010; International Application No. PCT/US2010/029062 filed Mar. 29, 2010.
European Patent Office, International Searching Authority, "International Search Report" mailed Mar. 18, 2011; International Appln. No. PCT/US2010/060797, filed Dec. 16, 2010.
USPTO "Non-Final Office Action" mailed Aug. 7, 2008 for U.S. Appl. No. 11/620,711, filed Jan. 7, 2007.
USPTO "Final Office Action" mailed Feb. 9, 2009 for U.S Appl. No. 11/620,711, filed Jan. 7, 2007.
USPTO "Non'Final Office Action" mailed Oct. 1, 2009 for U.S. Appl. No. 11/778,287, filed Jul. 16, 2007.
USPTO "Final Office Action" mailed Jan. 25, 2010 for U.S. Appl. No. 11/734,277, filed Apr. 12, 2007.
USPTO "Final Office Action" mailed Mar. 12, 2010 for U.S. Appl. No. 11/620,711, filed Jan. 7, 2007.
USPTO "Non-Final Office Action" mailed Apr. 1, 2010 for U.S. Appl. No. 12/237,103, filed Sep. 24, 2008.
Intellectual Property Office of Singapore, Search and Examination Report, dated Aug. 30, 2013 for Singapore Application No. 201107539-7.
Japan Patent Office "Notice of Rejection Ground" dated Mar. 26, 2013 for Japanese Patent Appln. No. 2012-506055.
Australian Government "Patent Examination Report No. 1" dated Apr. 5, 2013 for Australian Patent Appln. No. 2010236888.
Intellectual Property Office "Office Action" issued May 20, 2013 for Taiwan Patent Appln. No. 099144605.
USPTO "Notice of Allowance" mailed Jun. 24, 2013 for U.S. Appl. No. 12/635,138.
USPTO "Non-Final Office Action" mailed Sep. 14, 2012 for U.S. Appl. No. 12/635,138, filed Dec. 10, 2009.
USPTO "Non-Final Office Action" mailed Jul. 19, 2012 for U.S. Appl. No. 12/619,192, filed Nov. 16, 2009.
USPTO "Non-Final Office Action" mailed Oct. 12, 2012 for U.S. Appl. No. 12/645,870, filed Dec. 23, 2009.
Intellectual Property Office of Singapore "Search Report and Written Opinion" dated Nov. 8, 2012 for Singapore Appln. No. 201107539-7.
USPTO "Non-Final Office Action" mailed Dec. 21, 2012 for U.S. Appl. No. 12/648,024, filed Dec. 28, 2009.
European Patent Office, International Searching Authority, "International Preliminary Report on Patentability" mailed Jan. 10, 2013 for International Appln. No. PCT/US2011/039937, filed Dec. 16, 2010.
USPTO "Final Office Action" mailed Aug. 7, 2012 for U.S. Appl. No. 12/821,983, filed Jun. 23, 2010.
USPTO "Final Office Action" mailed Feb. 21, 2013 for U.S. Appl. No. 12/619,192, filed Nov. 16, 2009.
Canadian Intellectual Property Office, "Office Action" mailed May 17, 2013 for Canadian Patent Application No. 2,758,791.
Intellectual Property Office of Singapore, "Search Report and Written Opinion," mailed May 30, 2013 for Singapore Patent Application No. 201204603-3.
Intellectual Property Office, "Office Action" mailed Apr. 26, 2013 for Taiwan Patent Application No. 099111307.
USPTO, Final Office Action mailed Aug. 1, 2013 for U.S. Appl. No. 12/645,870.
USPTO, Office Action mailed Oct. 17, 2013 for U.S. Appl. No. 12/648,024.
Japan Patent Office, Notice of Rejection Ground, dated Oct. 29, 2013 for Japanese Patent Application No. 2012-546061.
China State Intellectual Property Office, First Office Action, dated Nov. 8, 2013 for Chinese Patent Application No. 201080016835.6.
Australian Government, Patent Examination Report No. 1, dated Nov. 15, 2013 for Australian Patent Application No. 2011271358.
Japan Patent Office, Notice of Rejection Grounds, dated Dec. 3, 2013 for Japanese Patent Application No. 2012-506055.
Intellectual Property Office, Decision, dated Dec. 30, 2013 for Taiwan Patent Application No. 099144605.
Japan Patent Office, Notice of Rejection Grounds, dated Jan. 21, 2014 for Japanese Patent Application No. 2013-516600.
Canadian Intellectual Property Office, Office Action, dated Jan. 23, 2014 for Canadian Patent Application No. 2803796.
U.S. Patent and Trademark Office, Non-Final Office Action, mailed Mar. 27, 2014 for U.S. Appl. No. 12/645,870.
Intellectual Property Office of Singapore, Search and Examination Report, dated Feb. 4, 2014 for Singapore Patent Application No. 201204603.
Canadian Intellectual Property Office, Notice of Allowance, dated Jun. 30, 2014 for Canadian Patent Application No. 2,758,791.
Australian Government, Notice of Acceptance, dated Jul. 16, 2014 for Australian Patent Application No. 2010236888.
Japan Patent Office, Decision of Rejection, dated Jun. 3, 2014 for Japanese Patent Application No. 2012-506055.
U.S. Patent and Trademark Office, Non-Final Office Action, mailed Jun. 19, 2014 for U.S. Appl. No. 12/821,983.

* cited by examiner

SYSTEMS AND METHODS FOR ESTABLISHING CONNECTIONS BETWEEN DEVICES COMMUNICATING OVER A NETWORK

CROSS-REFERENCES TO RELATED APPLICATIONS

This application claims priority to U.S. Non-Provisional application Ser. No. 12/426,103, filed Apr. 17, 2009, which is now issued U.S. Pat. No. 8,171,148.

TECHNICAL FIELD

The present disclosure generally relates to systems and methods for establishing connections between devices communicating over a network. Such systems and techniques may be useful, for example, in establishing connections between devices that are logically separated from each other by one or more firewalls. In various embodiments, the techniques and systems described below may be used to establish streaming connections between media players and placeshifting devices that provide media content across the network, although equivalent concepts could be readily applied in any number of other applications and settings.

BACKGROUND

The Internet and other digital communications networks continue to have significant effects on every aspect of personal and professional life. Network communications are becoming increasingly ubiquitous due to the reduced cost and increased capability of portable computing devices, the increasing prevalence and capability of mobile telephony and other wireless communications technologies, and other factors. As a result, consumers are increasingly expecting access to data, entertainment and other media without regard to the physical or geographic proximity of such content.

As an example, consumers have expressed significant interest in "place shifting" devices that allow remote viewing of television or other media content at locations other than the viewer's primary television set. Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network. Other media and other data-intensive applications are similarly enjoying widespread consumer interest.

While modern computing and network technologies allow increased mobility and improved access to desired content, a tradeoff often exists between access and security. Although firewalls and other structures can effectively preserve network security, these same structures can have the undesired effect of preventing access to desired services. To use placeshifting as an example, it may be very challenging to establish a connection between a placeshifting device and a media player if a firewall or other security structure resides between the two entities that wish to communicate. In addition to preventing undesired access to the secure network, then, a firewall may prevent legitimate and desired access to placeshifting or other services, particularly if the firewall is incorrectly or incompletely configured by the user.

Challenges can frequently arise in effectively establishing connections between clients and servers for placeshifting, media streaming and/or other applications. It is therefore desirable to create systems and methods for reliably and conveniently establishing connections between clients and servers across a network. These and other desirable features and characteristics will become apparent from the subsequent detailed description and the appended claims, taken in conjunction with the accompanying drawings and this background section.

BRIEF SUMMARY

According to various exemplary embodiments, systems and methods are described for establishing connections between client and server devices that are each communicating via a network. Certain methods and techniques described below may be used in some instances to establish media streaming connections between media players and placeshifting devices when firewalls or other impediments to direct network connections exist. Other embodiments may be equivalently used in other settings, including any settings relating to media streaming or the like.

In various embodiments, a method of establishing a media-streaming connection between a media player and a place-shifting device that are each communicating via a network is provided. A relay server receives a first request associated with the media player and a second request associated with the placeshifting device. In response to receiving the first and second requests, a first connection is established between the relay server and the media player and a second connection is established between the relay server and the placeshifting device. Data received by the relay server on each of the first and second connections is relayed to the other of the first and second connections to thereby establish the media streaming connection between the media player and the placeshifting device via the relay server.

In other embodiments, a method is provided for establishing a connection via a relay server between a client device and a server device that are each communicating via a network. A connectionless session is first attempted between the client device and the server device across the network. If the connectionless session is unsuccessful, the client and the server are directed to contact the relay server via the network, wherein the server is directed by a message transmitted via a pre-existing connection over the network. In response to the client and server subsequently contacting the relay server, a first connection is established between the relay server and the client and a second connection is established between the relay server and the server. Data received by the relay server on each of the first and second connections is then relayed to the other of the first and second connections to thereby establish the connection between the client and the server via the relay server.

In still other embodiments, a system is provided for establishing a media-streaming connection between a media player and a placeshifting device that are each communicating via a network. A relay manager module is configured to receive a request to establish the media-streaming connection between the media player and the placeshifting device. A relay instance module is configured to establish, in response to the request, a first connection with the media player and a second connection with the placeshifting device, and to relay data received on each of the first and second connections to the other of the first and second connections to thereby establish the media streaming connection between the media player and the placeshifting device.

Various embodiments, aspects and other features are described in more detail below.

BRIEF DESCRIPTION OF THE DRAWING FIGURES

Figure 2:
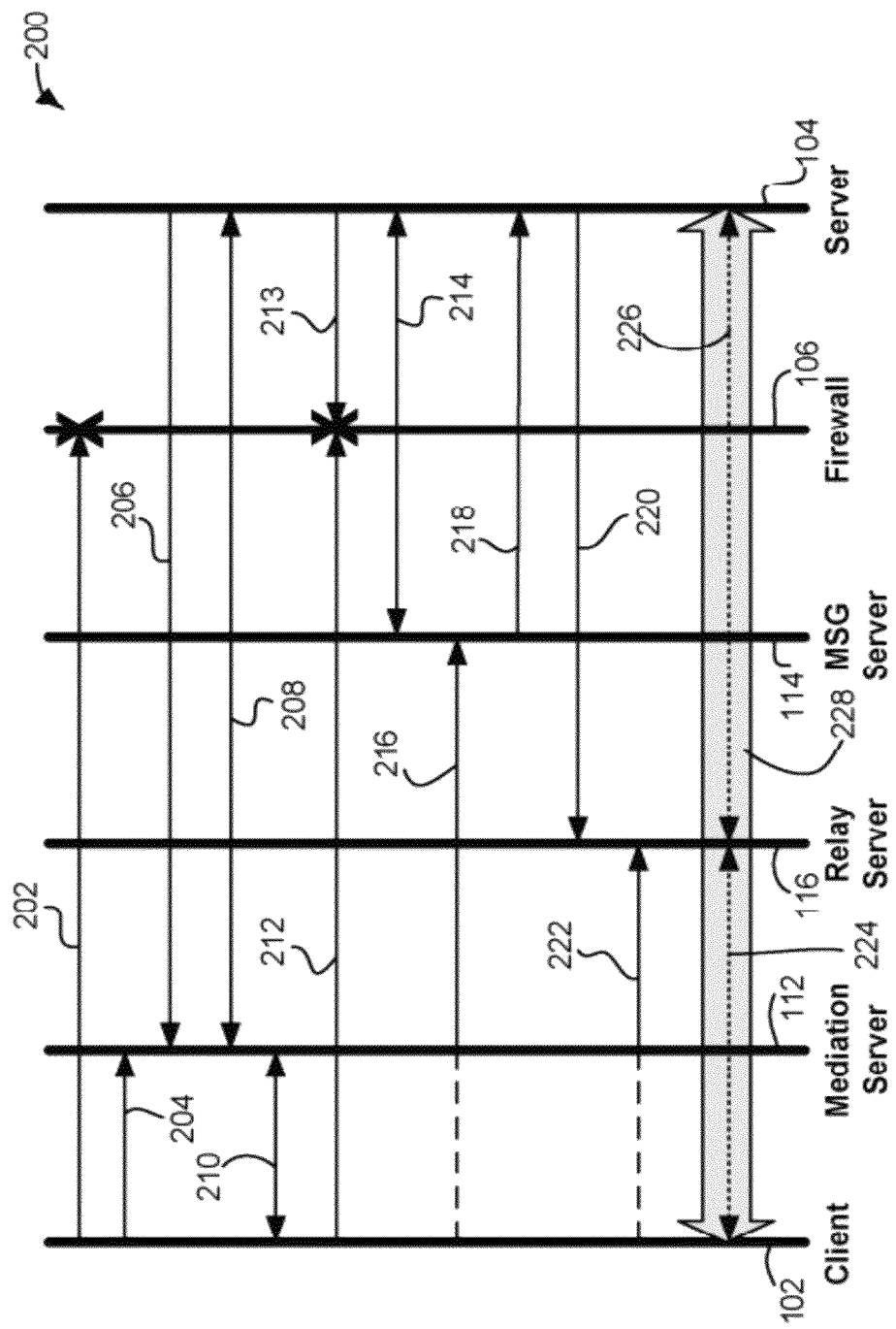
Figure 3:
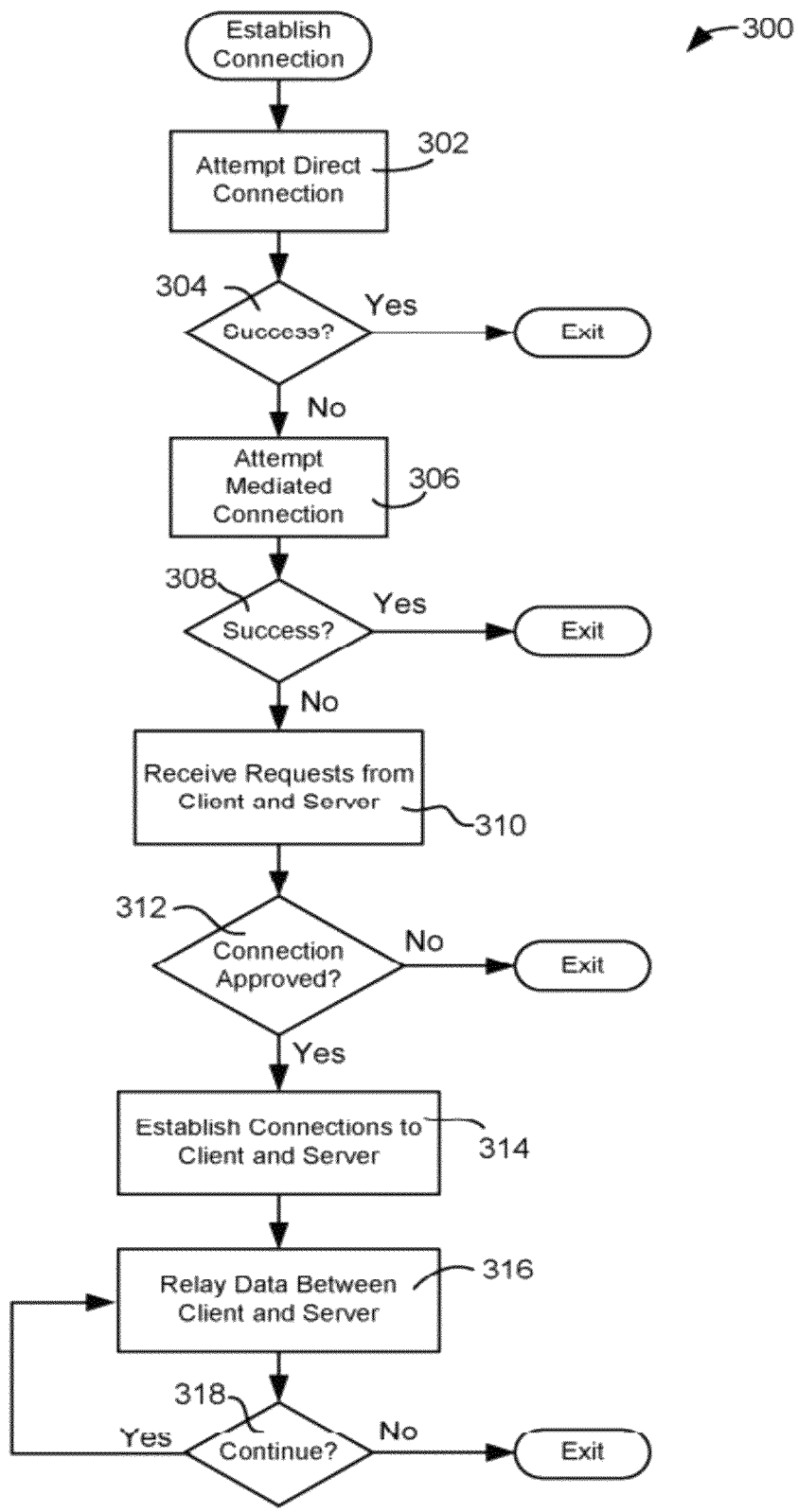

Exemplary embodiments will hereinafter be described in conjunction with the following drawing figures, wherein like numerals denote like elements, and FIG. 1 is a block diagram of an exemplary system for establishing and supporting relay connections between a client node and a server node;

FIG. 2 is a message flow diagram showing an exemplary process for reliably establishing connections between a client and a server; and FIG. 3 is a flowchart of an exemplary process for establishing a relay connection between a client node and a server node.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a relay server can establish separate connections with a client and a server to effectively bridge communications between the two devices when a direct connection is not available. A relay server could establish separate connections with a media player and with a placeshifting device, for example, and could subsequently relay data between the two connections as needed. Further, although the two connections established between the relay server and either or both of the client and the server could be implemented using any protocols or techniques, in some implementations the connections are reliable connections (e.g., transmission control protocol (TCP) connections) that can be originated from behind the firewall. By providing a relay server that is able to relay information between two separate connections to the client and server, users are provided with a very dependable mechanism for easily establishing client-server connections. Moreover, much of the information needed to configure such a connection can be readily automated in many implementations, thereby dramatically improving the likelihood of successful connections between clients and servers while simultaneously reducing the complexity (and therefore the frustration) associated with configuring such connections.

Although the following discussion often refers to placeshifting devices and techniques for convenience of illustration, equivalent embodiments could apply the same structures and methods described herein in any number of other settings. Indeed, the techniques described herein could be readily used to establish communications between any sorts of clients and/or servers over any sort of network. Examples of such applications could include any sort of media streaming applications, any sort of media sharing or storage applications, or any other application in which a client is attempting to establish a connection with a server that is logically isolated from the client via a firewall or other security mechanism.

Turning now to the drawing figures and with initial reference to FIG. 1, an exemplary network system 100 for establishing a connection between a client 102 and a server 104 over a network 110 suitably includes a relay system 116 that relays data between two connections separately established with client 102 and server 104. System 100 therefore allows client 102 and server 104 to communicate using relay system 116 even though a firewall 106 would otherwise prevent direct communications between client 102 and server 104, as described more fully below.

Client 102 is any device, component, module, hardware, software and/or other network node capable of receiving streaming, file based and/or other data provided by one or more servers 104 via network 110. Client 102 may be implemented with any sort of hardware, software, firmware and/or the like, including any sort of general or special purpose computing platform. In various embodiments, client 102 is personal computer (e.g., a "laptop" or similarly portable computer, although desktop-type computers could also be used), a mobile phone, a personal digital assistant, a set-top box (STB), an audio/video receiver of any sort, a video game player, a navigation device, a personal media player (such as the ARCHOS products available from the Archos company of Igny, France) or the like. In many embodiments, client 102 is a general purpose computing device that includes a media player or other application in software or firmware that is capable of securely connecting to server 104, as described more fully below, and of receiving and presenting content to the user of the device as appropriate. In other embodiments, however, client 102 is a standalone or other separate hardware device capable of receiving data via any portion of network 110 and of decoding the received data to provide an appropriate output to the user (e.g., an output on a television or other display). One example of a standalone media receiver product that could be used in some embodiments is the SLINGCATCHER product available from Sling Media of Foster City, California, although other products could be equivalently used.

Server 104 is any component, hardware, software logic and/or the like that is capable of transmitting packetized data over network no. In some embodiments, the packetized data is a packetized stream of media content in MPEG, Quicktime, Windows Media, Real Media, or any other format, although any sort of streaming, file based and/or other data could be equivalently applied in other embodiments. Server 104 may be implemented with any sort of general or special purpose hardware, software and/or firmware, including any sort of conventional personal computer, workstation or other server system.

Several examples of servers 104 suitable for use in placeshifting applications may be implemented using any of the various SLINGBOX products available from Sling Media of Foster City, Calif., although other products or servers 104 could be used in other embodiments. Many different types of placeshifting devices are generally capable of receiving media content from an external source, such as any sort of digital video recorder (DVR), set top box (STB), cable or satellite programming source, DVD player, and/or the like. In other embodiments, server 104 may be integrated with any sort of content-receiving or other capabilities. Server 104 may be a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote client 102 as appropriate. Such devices may also include a content database stored on a hard disk drive, memory, or other storage medium to support a personal or digital video recorder (DVR) feature or other content library as appropriate. Hence, in some embodiments, a media source may be physically and/or logically contained within a common component, housing or chassis with server 104. Examples of conventional placeshifting functions, features, systems and structures are described in United States Patent Publication No. 2006/0095471, although the features described herein could be equivalently applied with any number of other techniques and structures in addition to those described in that particular publication.

In still other embodiments, server 104 is a software program, applet or the like executing on a conventional computing system (e.g., a personal computer). In such embodiments, server 104 may encode, for example, some or all of a screen display typically provided to a user of the computing system for placeshifting to a remote location. One device capable of providing such functionality is the SlingProjector product available from Sling Media of Foster City, California, which executes on a conventional personal computer, although other products could be used as well. And again, the types of clients 102 and servers 104 used in system 100 are not limited to placeshifting devices; any other clients 102 and servers 104 that are capable of communicating on network 110 could be equivalently applied.

In other embodiments, server 104 simply provides streaming, file-based and/or any other sort of information on network 110, including responses to database queries or the like. As noted above, the present features are not limited to placeshifting applications, and may be used with any conventional server 104 device or application operating on network 110.

Network 110 is any digital or other communications network capable of transmitting messages between senders (e.g., server 104) and receivers (e.g., client 102). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

As noted above, direct connections between client 102 and server 104 may not always be available due to the presence of one or more firewalls 106. Firewall 106 represents any sort of hardware, software and/or combination of hardware and software that is used to restrict connections between a client 102 and a server 104. Firewalls 106 may be implemented using dedicated hardware in some instances, although in other cases firewall 106 may be implemented with an architecture of server and/or client systems, router controls (e.g., access control lists (ACLs)) and/or the like. Often, a firewall is simply a feature implemented within a router, such as a router used to provide an interface between a home or office LAN and a cable, fiber optic, digital subscriber line (DSL) and/or other provider connection, as desired.

When a firewall 106 or other feature prevents direct connections between clients 102 and servers 104, then other techniques for establishing connections may be attempted. A mediation server 112, for example, may be used to support connections using user datagram protocol (UDP) or the like. Mediation server 112 therefore serves as a sort of "gatekeeper" machine that establishes indirect connections between client 102 and server 104, and handles the synchronizing details between client and server as well as communicating with the rest of system 100.

In many implementations, mediation server 112 is able to establish UDP or other connectionless sessions with both client 102 and server 104. As a client 102 requests connection to a server 104 that is already in communication with the mediation server, the two parties to the proposed session can often simply exchange UDP (or other) parameters and continue communicating. This technique is often referred to as "UDP hole punching", and is often based upon conventional network address translation (NAT) techniques. Such techniques are often unsuccessful, however, particularly when the client 102 and server 104 are separated by a relatively sophisticated firewall 106 (e.g., a firewall associated with many corporate networks) that may recognize that the party originally involved in establishing the UDP session (e.g., the mediation server 112) is no longer the party involved in communications after the client 102 assumes the parameters previously used with server 112. Moreover, UDP or similar sessions may involve some manual configuration by the user, which can be inconvenient and often difficult, particularly to relatively unsophisticated users. When neither direct connection nor UDP-type proxy service is available to the user, it would be desirable to provide an additional connection feature that nevertheless allows the client 102 to communicate with server 104.

Various embodiments therefore provide a relay system 116 that is capable of establishing separate connections with the client 102 and the server 104 and relaying information between the two connections to thereby create a bridged connection between the client 102 and server 104. To that end, relay system 116 suitably includes one or more relay servers 120 that are capable of establishing and processing the various connections between any number of clients 102 and servers 104. In various embodiments, each relay server 120 includes a relay manager module 122 that invokes any number of relay instances 124 that process relay sessions in response to received requests for connections, as described more fully below. Relay manager module 122 may also interact with a database 126 and/or an administrative interface 128 to control access to the relay function, to implement business rules, and/or to take other actions as desired.

In various embodiments, load balancing 118 may also be provided to allocate relay servers 120 and/or other resources efficiently and effectively. Load balancing 118 may be implemented using any combination of hardware and/or software resources, and may be based upon network traffic, processor loads on servers 120, geographic distribution of clients 102 and/or servers 104, and/or any other factors as appropriate.

In various embodiments, each relay server 120 is implemented using conventional computer server hardware and software. Each relay server 120 may be implemented, for example, with a server computer system that is based upon any processor, architecture and/or operating system. In various embodiments, each relay server 120 is an actual or virtual computer system executing an operating system such as any version of the LINUX, UNIX, SOLARIS, NETWARE, WINDOWS, OS/X, AIX or other operating systems, and/or the like. The various UNIX/LINUX operating systems typically provide a computing core that is capable of executing a relay manager module 122 as an application, as well as any number of daemons, processes, applications or other relay instance modules 124 as desired. In an exemplary embodiment, relay manager module 122 is implemented using the JAVA environment available from Sun Microsystems of Sunnyvale, Calif., with the relay instance modules 124 implemented with conventional C, C++ or other programming. Other embodiments may implement the various components of system 116 using any other programming languages, scripting languages, development or execution environments, and/or the like.

In an exemplary embodiment, when a request for a relay connection is received from a mediation server 112, client 102 or other requesting party, the relay manager module 122 allocates incoming port numbers on server 120 to the connection and invokes a new relay instance 124 to process the connection. The instance receives the assigned port numbers and waits until both the client 102 and server 104 have contacted the relay server 120 to request connections. Requests from client 102 and server 104 are received at system 116 and forwarded to the appropriate ports by load balancing features 118 or the like. Although connections may be established using TCP, UDP or any other protocols, in various embodiments the connections are originated by client 102 and server 104 using TCP protocols to aid in traversing any firewalls 106 that may be intervening. Because most firewalls 106 do not block TCP connections that originate from within the trusted network, such connections can be very effective in establishing communications through the relay server 120.

After establishing separate connections with client 102 and server 104, relay instance 124 suitably relays data received on each connection to the other connection to create a virtual channel between client 102 and server 104. This virtual connection may be maintained or terminated at any time, based upon any criteria. In various embodiments, relay instance 125 tracks the elapsed time since the connection began and/or the amount of data processed thoughout the course of the connection. This information may be shared with relay manager 122 to terminate the connection after a pre-determined period of time or a pre-determined amount of traffic has been processed. Time and bandwidth consumption may be further stored in database 126 to allow further authentication, authorization and/or the like.

Communications from the server 104 with relay system 116 may be initiated in any manner. In various embodiments, server 104 maintains a relatively constant connection with a messaging server 114 at a uniform resource locator (URL) or other network address that can be readily contacted from behind firewall 106. Messaging server 114 may simply be a TCP server, for example, that is automatically accessed when server 104 starts up. In such cases, server 104 contacts the messaging server 114 on startup (or on some other temporal basis), establishes a TCP or similar connection, and then awaits further action. This connection may be kept alive using relatively low bandwidth "keep alive" features that are part of the TCP protocol. By pre-establishing the connection from the server 104 to the messaging server 114, a channel is maintained that can be used to send instructions or requests to the server 104, even though the server is behind a firewall 106. This is because many routers used in firewalls 106 will allow outgoing TCP connections that are originated within the trusted space while disallowing incoming TCP (and other) connections. After establishing a TCP or other connection from the server 104 to message server 114, that pre-existing connection can be used to transmit an instruction to server 104 to establish a separate connection with the relay server 116. This second connection can be established as another outgoing TCP (or other protocol) communication that is not likely to be blocked by firewall 106. That is, message server 114 can transmit an instruction over the pre-existing channel that directs server 104 to separately contact the relay server. This instruction may optionally include information about the client 102 or other party that is requesting the connection, although this information need not be present in all embodiments. When instructed to do so, server 104 suitably establishes a TCP or other connection with the relay server that can be used to transmit data to client 102, as described more fully below.

As noted above, the relay server 116 can establish connections with both the client 102 and the server 104 so that data can be relayed from one connection to another. While the relaying of data does place additional processing loads upon server 116, this does create a very convenient and effective mechanism for establishing connections between the client and server.

Turning now to FIG. 2, an exemplary process 200 for establishing a connection between a client 102 and a server 104 over network 110 is shown. In this example, client 102 initially attempts to establish a direct connection 202 with the server 104, but this connection 202 is blocked by firewall 106.

Following an unsuccessful attempt to create a direct connection, client 102 attempts to create a mediated connection 205 using mediation server 112. In this scenario, client 102 sends message 204 to mediation server 112 to request a UDP (or other) session 210 with the mediation server 112. Server 104 similarly transmits a request 206 to establish a UDP session 208 with the mediation server 112; this request 206 from server 104 may be sent at any time, including at times prior to client 102 sending message 204. Server 104 may automatically contact mediation server 112 with message 206 upon startup, for example, so that a UDP session 208 is already available when client 102 requests access to server 104. After both client 102 and server 104 are communicating with a common proxy (e.g., server 112), the proxy may forward UDP (or other) information associated with client 102 to server 104, and vice versa, in hopes that the client 102 and server 104 can directly communicate thereafter using the shared UDP information from the proxy server, as indicated by sessions 212 and 213 in FIG. 2. As noted above, however, many firewalls 106 will not allow such connections.

Again recalling that server 104 has previously established a TCP or other reliable connection 214 with a message server 114, this pre-existing connection 214 can be used to establish a relay connection from server 104 to relay server 116. When a proxy-type connection is unsuccessful, message server 114 suitably directs server 104 (via message 218) to initiate a separate connection with relay system 116. While FIG. 2 shows message 218 as being sent from message server 114 to server 104, this message 218 can be initiated in response to a request 216 received from any number of sources. In various embodiments, mediation server 112 sends request 216 to message server 114 to instruct the server 104 to contact relay server 116. In other embodiments, request 216 is transmitted by the client 102 to initiate instruction message 218. In either event, the pre-existing connection 214 established from server 104 to message server 114 is used to direct the server 104 to contact relay system 116 as appropriate. When directed to do so, server 104 sends request 220 to the relay server 116. This request 220 is appropriately processed at system 116 to create connection 226 using TCP, UDP, and/or any other appropriate protocol.

Connections between relay system 116 and client 102 may be established in any manner. In the exemplary embodiment shown in FIG. 2, either client 102 or mediation server 112 initiates a request 222 that results in connection 224 between relay server 116 and client 102. Request 222 may be initiated in response to an instruction from mediation server 112 to client 102 when a proxy connection is unsuccessful. Other embodiments, however, may initiate request 222 in any other manner. Again, if client 102 initiates the connection using TCP, then the ensuing connection 224 is very likely to pass through any intervening firewalls 106 without significant issue. Other embodiments, however, may use UDP or other protocols as appropriate.

Once connections 224 and 226 are in place, then relaying of data between client 102 and server 104 can proceed as described above over the relay connection 228. In a placeshifting application, for example, streaming media can be provided over a connection 228 from a placeshifting server 104 to be played on a media player client 102. In such embodiments, it may be desirable to limit the bit rate, frame rate, resolution or other encoding parameters of the media stream during relay transmission in order to reduce concerns about bandwidth and processing capability on servers 120. This limit could be imposed by, for example, instructions transmitted to server 104 from relay server 116 or another source, as desired. Alternately, firmware or other instructions in server 104 may configure encoding, streaming or other features as desired whenever a connection is made through relay server 116. Again, other features and implementations could be contemplated in addition to placeshifting.

Turning now to FIG. 3, an exemplary method 300 for establishing a connection between a client 102 and a server 104 suitably includes the broad steps of receiving requests 222, 220 from client 102 and server 104, respectively, at a relay server 120 (function 310); establishing the two connections 224, 226 between client 102 and server 104 (function 314); and relaying data between the two connections 224, 226 at the relay server 120 (function 316) to establish the relay connection 228. Other embodiments may provide additional features as well, such as approving the relay connection (function 312), discontinuing the relay connection after time or bandwidth limits are exceeded (function 318), and/or the like.

As noted above, relay connections do consume resources on server 120, so it may be desirable in many embodiments to encourage clients 102 to attempt direct connections (functions 302 and 304) and/or mediated connections (functions 306 and 308) prior to attempting a relay connection. In the event that direct and/or mediated connections are unsuccessful, then the relay connection may be attempted. Any number of rules or procedures could be implemented to govern if and when the relay feature is available to any particular user, client 102 and/or server 104. In the exemplary embodiment shown in FIG. 3, relay connections using server 120 are attempted after a direct connection (function 302) and a mediated (e.g., UDP) connection (function 306) have both been unsuccessful (functions 304, 308). Other embodiments may allow users to manually force a relay connection, or to automatically initiate a relay condition when it is known (or when it can be confidently assumed) that a direct or mediated connection will be unsuccessful. Such features may be coded into a media player or other client application executing at client 102, and/or may be enforced using business rules stored in database 126 or the like.

As noted above, relay server 120 creates the relay connection 228 in response to connection requests 220, 222 received from server 104 and client 102, respectively. In an exemplary embodiment, a relay instance 124 monitors ports identified by the relay manager module 122 for an appropriate period of time. If requests 220 and 222 are received prior to the expiration of an appropriate timeout period (e.g., on the order of several seconds or so), then processing continues. If no request is received from either or both of the client 102 or server 104, then the connection can be aborted.

Connections can be approved or rejected according to any suitable rules (function 312). As noted above, any number of business rules could be implemented to limit or restrict access to the relay server. Such rules may include limiting the feature to particular users, particular servers, and/or particular clients. In still other embodiments, users (or servers, or clients) could be restricted in the number of relay services that are allowed. Such a restriction could be an aggregate number (e.g., for the lifetime of the client or server), or could re-set after any appropriate period of time (e.g., ten relay connections per month).

Users may be identified with a userid/password, digital signature, biometric identification, or any other digital credential. Clients 102 and servers 104 may be similarly identified by any sort of digital credential, including any sort of digital signature or other identifier (e.g., a serial number, MAC address, and/or the like). Such information may be contained in requests 220 and/or 222, and may be compared against information stored in database 126 or elsewhere as desired. Approval can be processed by the relay manager module 122 in many embodiments, although other embodiments may process approval using the relay instance 124, an administrative feature 128, and/or any other feature as desired.

If approval is granted, then the connections 224 and 226 are established from the relay server 120 (function 314) and relaying of data between the client 102 and server 104 can commence over the relay connection 228 (function 316). In various embodiments, data stored within database 126 and/or in the relay instance 124 can be used to discontinue connection 228 according to appropriate rules. In some embodiments, it may be desirable to discontinue all connections (or just connections associated with particular clients, servers or users) after a pre-determined period of time (e.g., thirty minutes or so, although other embodiments may use longer or shorter times) or after a pre-determined amount of data has been processed (e.g., ten gigabytes/month, or any other value) (function 318). The particular rules and parameters implemented will vary from embodiment to embodiment; any number of rules could be implemented using the rules engine of database 126 as desired.

Generally speaking, the various steps of method 300 may be carried out with any sort of hardware, software and/or firmware logic within system 100. Method 300 may be carried out, for example, by a relay server 120 (FIG. 1) operating in conjunction with any appropriate client 102 and/or server 104 as appropriate. FIG. 3 also shows functions 302, 304, 306, 308 relating to attempting direct and mediated connections, as described above. In practice, these features may be carried out by client 102 or server 104 rather than by relay server 120. In various embodiments, the various steps of method 300 are carried out in response to software or firmware instructions stored in a memory, or on a disk drive and/or other storage associated with relay server 120 and/or client 102. Such instructions may be executed by any processor and/or other processing features within server 120, client 102 and/or the like. The particular means used to implement each of the various functions shown in FIG. 3, then, could be any sort of processing hardware (such as server 120, client 102 and/or server 104 of FIG. 1) executing conventional software logic in any format.

As described herein, then, new systems and techniques for establishing connections between clients and servers over a digital network have been described. Various techniques described herein allow clients and servers to separately establish TCP or other connections with a relay server that effectively relays data between the two connections to establish a virtual point-to-point link between the client and server. By allowing each of the client and the server to initiate connections with a common relay service, firewalls that would otherwise prevent direct connections between the client and server can be traversed, thereby allowing data transfer or other communications between the client and server without compromising the security of the network. This service could be used to support placeshifting or other streaming media applications by allowing a placeshifting server device to stream media data to the relay server, which in turn relays the received stream to the media player client. Equivalent embodiments could provide similar features for transfer of any stream, file-based, packet-based or other data in any format.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a relay server to establish a media streaming connection between a media player and a placeshifting device that are each communicating with the relay server via a network, the method comprising:
   receiving, by the relay server, a first request associated with the media player and a second request associated with the placeshifting device, wherein both the first and second requests are received by the relay server via the network;
   in response to receiving the first and second requests, the relay server establishing a first connection between the relay server and the media player and a second connection between the relay server and the placeshifting device, wherein the first connection is established as an outgoing connection from the media player to the relay server and the second connection is established as an outgoing connection from the placeshifting device to the relay server; and
   the relay server relaying data received by the relay server on each of the first and second connections to the other of the first and second connections to thereby establish the media streaming connection between the media player and the placeshifting device in which the first and second connections form the media streaming connection as a bridged connection between the media player and the placeshifting device for delivering a placeshifted media stream from the placeshifting device to the media player.

2. The method of claim 1 further comprising the relay server directing the placeshifting device to limit a bandwidth of the placeshifted media stream transmitted via the relay server.

3. The method of claim 1 wherein the receiving occurs in response to an unsuccessful user datagram protocol (UDP) connection between the media player and the placeshifting device.

4. The method of claim 1 wherein the receiving occurs in response to an unsuccessful attempt to establish a direct connection between the media player and the placeshifting device.

5. The method of claim 1 further comprising directing the placeshifting device to send the second request to the relay server.

6. The method of claim 5 wherein the directing comprises directing a message to be sent to the placeshifting device across a pre-established connection with the placeshifting device via the network.

7. The method of claim 1 further comprising discontinuing the media streaming connection after a pre-determined time has elapsed.

8. The method of claim 1 further comprising discontinuing the media streaming connection after a pre-determined amount of data has been relayed.

9. The method of claim 1 further comprising approving the media streaming connection prior to establishing the first and second connections based upon identification information associated with at least one of the placeshifting device, the media player, and a user of the placeshifting device.

10. The method of claim 1 further comprising approving the media streaming connection prior to establishing the first and second connections based upon identification information contained in at least one of the first and second requests.

11. A method of establishing a network connection via a relay server between a media player client and a placeshifting server that are each communicating via a network, the method comprising:
    first directing at least one of the media player client and the placeshifting server to establish a connectionless session across the network between the media player client and the placeshifting server;
    if the connectionless session is unsuccessful, directing both the media player client and the placeshifting server to contact the relay server via the network;
    in response to the client and the placeshifting server subsequently contacting the relay server via the network, directing the media player client to establish a first connection to the relay server via the network and also directing the placeshifting server to establish a second connection via the network from the placeshifting server to the relay server, wherein the first connection is an outgoing connection made from the media player client to the relay server and the second connection is an outgoing connection made from the placeshifting server to the relay server; and
    relaying data received by the relay server on each of the first and second connections via the network to the other of the first and second connections via the network to thereby establish the network connection between the media player client and the placeshifting server via the relay server in which the first and second connections form a bridged connection between the media player client and the placeshifting server for delivering a placeshifted media stream from the placeshifting server to the media player client.

12. The method of claim 11 further comprising the relay server directing the placeshifting server to limit a bandwidth of the placeshifted media stream transmitted via the relay server.

13. A system for establishing a media streaming connection between a media player and a placeshifting device that are each communicating via a network, the system comprising:
    a relay manager module configured to receive a request to establish the media streaming connection between the media player and the placeshifting device; and
    a relay instance module configured to establish, in response to the request, a first connection with the media player and a second connection with the placeshifting device, and to relay data received on each of the first and second connections to the other of the first and second connections to thereby establish the media streaming connection between the media player and the placeshifting device, wherein the relay instance module is configured to establish the first and second connections by directing the media player and the placeshifting device to establish outgoing connections to the relay instance module via the network.

14. The system of claim 13 wherein the system is further configured to direct the placeshifting device to limit a bandwidth of the placeshifted media stream transmitted via the media streaming connection.

15. The system of claim 13 further comprising a database configured to store information, and wherein the relay manager module is configured to allow or disallow the media streaming connection based upon the information stored in the database.

16. The system of claim 15 wherein the information stored in the database comprises an elapsed time that the media streaming connection has been established, and wherein the relay manager module is further configured to disallow the media streaming connection when the elapsed time exceeds a pre-determined value.

17. The system of claim 15 wherein the information stored in the database comprises a total time that the placeshifting device has used the system, and wherein the relay manager module is further configured to disallow the media streaming connection when the total time exceeds a pre-determined allowed value.

18. The system of claim 15 wherein placeshifting device is directed to establish the second connection by a message transmitted via a pre-existing connection over the network.

19. The system of claim 15 further comprising a mediation server configured to attempt to connect the placeshifting device and the media player via the network using a connectionless protocol, and, if the attempt to connect via the connectionless protocol is unsuccessful, to initiate the request to establish the media streaming connection between the media player and the placeshifting device via a connection-based protocol.

20. The system of claim 15 further comprising a message server configured to establish a pre-existing connection with the placeshifting device across the network using a connection-based protocol and to send a message to the placeshifting device across the pre-existing connection that directs the placeshifting device to establish the second connection.

\* \* \* \* \*